Figure 1:
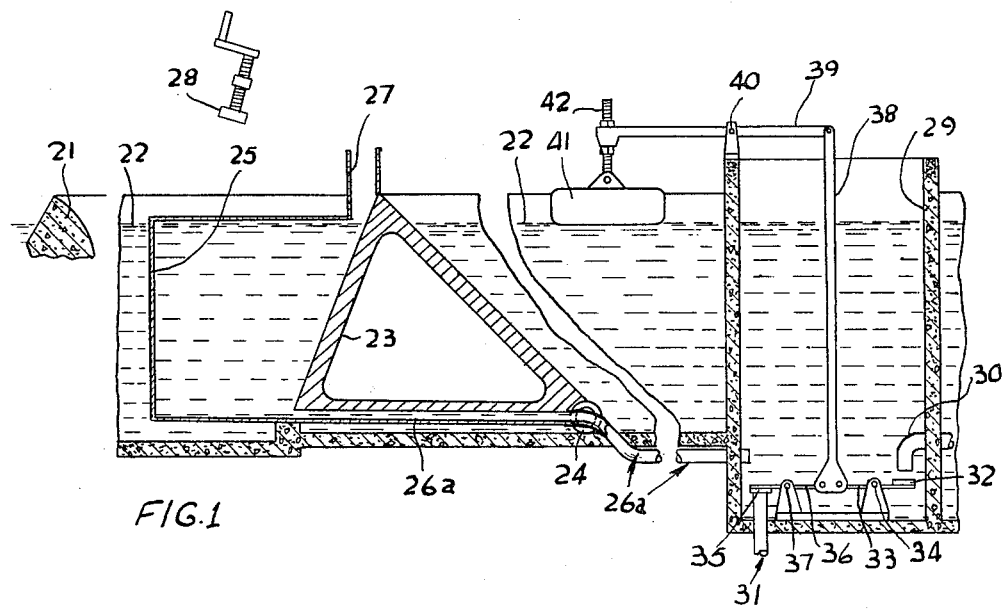

Nov. 29, 1966   L. A. TURNER   3,287,917
APPARATUS FOR AUTOMATIC CONTROL OF IMPOUNDED WATER
Original Filed April 24, 1961

LAWRENCE A. TURNER
INVENTOR

By Wenderoth, Lind & Ponack
ATTORNEYS

United States Patent Office 3,287,917
Patented Nov. 29, 1966

3,287,917
APPARATUS FOR AUTOMATIC CONTROL OF OUTFLOW OF IMPOUNDED WATER
Lawrence Alexander Turner, Jordaanskraal, Middleton, Cape Province, Republic of South Africa, assignor to Fluid Dynamics (Proprietary) Limited, Port Elizabeth, Cape Province, Republic of South Africa, a company of the Republic of South Africa
Original application Apr. 24, 1961, Ser. No. 105,140, now Patent No. 3,221,504, dated Dec. 7, 1965. Divided and this application May 24, 1965, Ser. No. 458,197
Claims priority, application Republic of South Africa, Apr. 29, 1960, 1,741/60
6 Claims. (Cl. 61—25)

This is a division of application Serial No. 105,140, filed April 24, 1961, now U.S. Patent No. 3,221,504.

This invention relates to apparatus for the automatic regulation of the outflow from an open body of water impounded by a barrier, and having a varying level when the level of said body of water is below a predetermined upper limit, and is based on subject matter divided out of co-pending patent application Serial Number 105,140.

In the art of irrigation, it is often necessary to control the discharge of water from a weir, dam, reservoir or the like to an irrigation canal, by means of an obturating device such as a radial gate, a drum gate, a sector weir or a plain vertical sliding gate valve, so that flow will take place when sufficient water is stored above the weir or in the dam or the like, and which obturating device is required to be closed at times when the flow of water into the storage space of the weir or the like, is less than what is sufficient for irrigation purposes. The invention envisages a method and apparatus to provide accurate and entirely automatic control of the discharge of water from a weir or the like into a canal, without recourse to human supervision or to elaborate float switches, powered hoists, counterbalances or other equipment associated with automatic operation of obturating devices presently used for this purpose.

In the case of a diversion weir provided across a river, the obturating device, hereinafter referred to as a gate, must fulfill the following requirements:

(1) The gate must remain closed until the water level reaches a predetermined height in the weir which is well above the level of the discharge canal. This ensures that the floating trash and debris which often accompanies the first rush of water after a rain storm in the catchment area of the river feeding the weir, is not drawn directly into the canal. In the event of weak river flows, particularly at night, it must also ensure that maximum use is made of the storage capacity of the weir but without spilling water over the crest.

(2) As soon as the required level is reached, the gate must open automatically to a minimum predetermined amount depending on the level which the water in the weir must reach before the gate opens at all, and it must then deliver the predetermined flow of water to the canal for as long as the level of water in the weir lies between certain specified upper and lower limits. When the level drops below the lower limit, the gate must close completely.

(3) If the water in the weir rises to such an extent that the gate delivers an excessive flow to the canal, the device must automatically close the gate. It should open the gate automatically as soon as the river subsides to an acceptable level.

(4) When the flow ceases in the river, the device must ensure that the weir is full before the gate opens so that irrigation can take place at a later date when required.

According to the invention apparatus for the automatic regulation of the outflow from an open body of water impounded by a barrier such as a weir, and having a varying level when the level of said body of water is below a predetermined upper limit, which apparatus comprises a gate contiguous to said body of water and arranged to be opened and closed to control the outflow of water from said impounded body of water. The gate has a hollow float coupled to the side thereof facing the body of water and has a water inlet and outlet aperture adjacent its bottom and an air vent at its top. Conduit means connect the inlet and outlet aperture of the float to a control chamber which is in communication with the impounded body of water. This control chamber is provided with control means for controlling the withdrawal and supply of water from and to the control chamber, and consequently from and to the float, and its discharge downstream of the barrier at varying controlled rates so as to vary the buoyancy of the float and consequently the opening and closing movements of the gate. The control means is operatively dependent on the level of the impounded body of water, and comprises valve means the opening and closing operations of which are effected through the medium of float means operated by the rising and falling of the level of the impounded body of water.

More particularly the control chamber is provided with a valve-controlled inlet from the impounded body of water and a valve-controlled outlet discharging downstream thereof. The opening and closing of these valves is effected through the float means in such a manner that when the level of the impounded body of water falls by a predetermined amount below a certain level, the discharge oulet is closed and the inlet is opened resulting in the gate float becoming flooded and, on sinking, closing the gate, while on said level of the impounded body of water rising by a predetermined amount above said certain level, the discharge outlet is opened and the inlet is closed, resulting in the gate float being emptied and thereby rising to open the gate.

Figure 2:
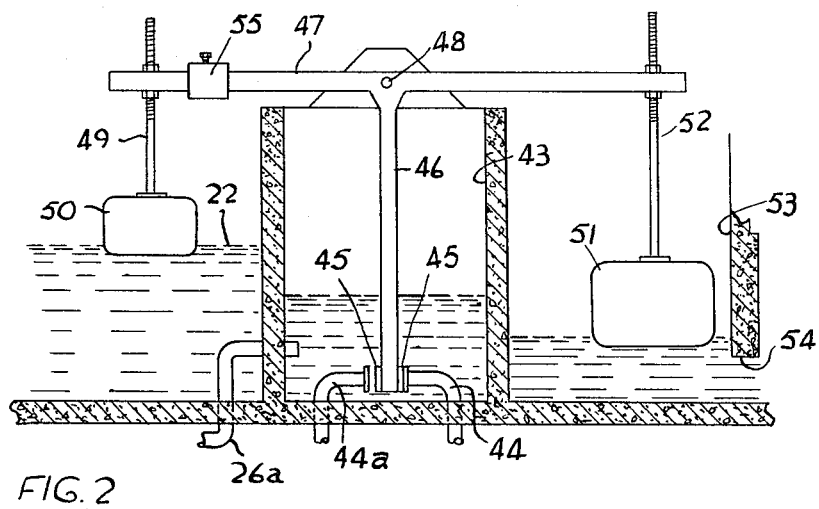

To enable the invention to be more clearly understood and carried into practice, reference is now made to the accompanying drawings in which:

FIG. 1 is a partly diagrammatic vertical cross-sectional view of the control apparatus made according to the invention and shown in relation to the float-controlled gate and FIG. 2 is a vertical part-sectional elevating showing an alternative construction for the control apparatus.

Referring to FIG. 1 reference 21 denotes the top part of the wall of a weir on the upstream side of which an open body of water 22 is impounded which has a varying level and from which a predetermined flow is required to be discharged into an irrigation canal (not shown) by way of a radial gate 23, pivotally mounted for vertical part-rotary movement about a hollow pivot axis shaft 24, which is located downstream with respect to the gate 23.

Opening and closing of the gate 23 is controlled by means of a hollow float 25 attached to the upstream side thereof as shown, and having a water inlet and outlet conduit 26a communicating with its bottom side. The float 25 is provided with an air vent 27 at its top side and its upward opening movement is limited by an adjustable stop 28.

For controlling the admission to and withdrawal of water from the float 25, a control chamber 29 is connected thereto by the conduit 26a towards its bottom end. The control chamber 29 is located at any convenient distance from the float 25 but must be in communication with the body of impounded water 22 by way of the downwardly bent water inlet pipe 30. A vertically disposed outlet pipe 31 extends through the bottom of the control chamber 29.

The downwardly directed open end of the bent inlet pipe 30 is arranged to be closed by an upwardly moving valve 32 fixed to the outer arm of a valve lever 33 fulcrumed by a pivot pin 34, while the upwardly directed open end of the outlet pipe 31 is arranged to be closed by downwardly moving valve 35 fixed to the outer arm of a valve lever 36 fulcrummed by a pivot pin 37.

The inner arms of the two valve levers 33 and 36 are pivotally connected to a vertical link rod 38, in turn pivotally connected at its top end to the end of one arm of a float lever 39 fulcrummed by a pivot pin 40 and carrying at its opposite end a valve-actuating float 41 capable of vertical adjustment by a screw-threaded rod 42 attached to and extending upwardly from its top side and passing through an aperture in the end of the float lever 39. The float 41 is arranged to be operated by rising and falling of the water level of the body of water 22. As shown in FIG. 1 the level of the body of water 22 is below the crest of the weir wall 21, which has resulted in a lowering of the float 41, thereby causing the outlet pipe 31 to be closed and the inlet pipe 30 to be opened whereby water enters the control chamber 29, and, via the conduit 26a, flows into and substantially fills the float 25, which accordingly sinks and closes the gate 23.

When the level of the body of water 22 rises sufficiently, the valve-actuating float 41 will also rise and produce a downward thrust in the link rod 38, which will cause the valve 35 to open and the valve 32 to close. The water in the control chamber 29 will now be discharged via the outlet pipe 31 and consequently the float 25 will be emptied so that its buoyancy will cause it to rise and open the gate 23.

In the alternative construction of control apparatus shown in FIG. 2, a control chamber 43 is connected by a conduit 26a to the float 25 in the same manner as shown in FIG. 1. In this case however outlet pipe 44 and an inlet pipe 44a are arranged so that their spaced inner open ends face towards one another and are arranged to be closed and opened by valves 45 attached one on either side of the bottom end of a vertical lever extension 46, of a float lever 47 fulcrummed by the pivot pin 48. The inlet pipe 44a is connected to body of water 22 and corresponds to the inlet pipe 30 of FIG. 1, while the outlet pipe 44 corresponds to the outlet pipe 31 of this figure.

Attached to one end of the float lever 47 by a screw-threaded vertical rod 49, is a float 50, while a second float 51 of great buoyancy than the float 50, is attached to the opposite end thereof by a screw-threaded rod 52. The float 50 is arranged to be operated by the varying level of the body of water 22, while the float 51 is arranged to be operated by the level of water in the stream of water discharged past the gate 23 which has free access to a float chamber 53 by way of the opening 54. A balance weight 55 is adjustably positionable along the arm of the float lever 47 to which the float 50 is attached, to vary the control conditions as required.

When the water in the weir is below the specified predetermined level, the assembly is balanced so that the inlet pipe 44a is open, which results in the control chamber 43 being filled with water, and this in turn causes the float 25 to be filled, via conduit 26a, so that the gate remains closed.

When the water in the weir rises to the appropriate predetermined level, it displaces the float 50 upwards, thereby closing the inlet pipe 44a, and thereby opening the outlet pipe 44, and consequently emptying both the control chamber 43, and the float 25, thus causing the gate to become buoyant and therefore to open. When water discharging past the gate 23 commences to flow into the discharge canal, the float 51, which has greater buoyancy than the float 50, can be set to over-ride the force exerted by the float 50, if the outflow in the canal should exceed a certain predetermined value.

What I claim is:

1. Improved apparatus for the automatic regulation of the outflow from an open body of water impounded by a barrier and having a varying level when the level of said body of water is below a predetermined upper limit, which apparatus comprises a gate contiguous to said body of water and arranged to be opened and closed to control the outflow of water from said impounded body of water, a hollow float fixedly coupled to said gate on the side of said gate facing said body of water, said float having a water inlet and outlet aperture adjacent the bottom thereof and having an air vent at the top thereof, conduit means connecting said inlet and outlet aperture to a stationary control chamber, said control chamber having intake passage means in communication with the impounded body of water and discharge passage means for discharging water from the control chamber downstream of the barrier, and control means in said control chamber for controlling closure of both passage means for the withdrawal and supply of water from and to the control chamber and consequently from and to said float to vary the buoyancy of the float and consequently the opening and closing movements of the gate, said control means being operatively dependent on the level of the impounded body of water, and wherein the control means comprises valve means movable to close each one of said passage means while the other one remains open, the opening and closing operations of which are effected through the medium of float means connected to said valve means and operated by the rising and falling of the level of the impounded body of water.

2. Improved apparatus as claimed in claim 1, wherein the valve means comprises a valve member for the inlet passage means and a valve member for the discharge passage means, and wherein the opening and closing of these valves is effected through the float means in such a manner that when the level of the impounded body of water falls by a predetermined amount below a certain level, the discharge passage means is closed and the inlet passage means is opened, resulting in the gate float becoming flooded and, on sinking, causing the gate to close while on said level of the impounded body of water rising by a predetermined amount above said certain level, the discharge passage means is opened and the inlet passage means is closed, resulting in the gate float being emptied and thereby rising to open the gate.

3. Improved apparatus as claimed in claim 2, wherein the connection between the float means and the two valves comprises a substantially horizontal float lever fulcrumed intermediately of its ends near the top end of the control chamber having a link rod pivotally connected to the end of one arm thereof and extending downwardly into the control chamber, two valve-actuating levers having their one ends pivotally connected to the lower end of the link rod, one of said valve-actuating levers carrying on its opposite end the valve member for closing the discharge passage means and which moves downwardly in the closing direction, the other valve-actuating lever carrying on its opposite end the valve member for closing the inlet passage means and which moves upwardly in the closing direction, and the other end of said float lever having a float thereon which constitutes said float means, said float being arranged to rise and fall with the rising and falling of the level of the impounded body of water.

4. Improved apparatus as claimed in claim 2, wherein the connection between the float means and the valves comprises a substantially horizontal float lever fulcrumed intermediately of its ends near the top end of the control chamber, and said float means comprising a first valve-actuating float attached to one arm of said float lever and arranged to rise and fall with the rising and falling of the level of the impounded body of water, and a second valve-actuating float attached to the opposite arm of the float lever and arranged to rise and fall with the rising and falling level of a discharge stream flowing past the gate when open along a canal, said connection further comprising a downwardly directed extension arm fast with the float lever and projecting downwardly into the control chamber, said two valve members being fixed thereon one to each opposite side thereof, which valve members are arranged to coact, one with the inlet passage means and the other with the discharge passage means, the arrangement being such that when the first valve-actuating float rises and the second valve-actuating float falls, by a predetermined amount, the inlet passage means is closed and the discharge passage means is opened whereby the gate float is emptied to cause opening of the gate, while reverse movements of these two floats causing opening of the inlet passage means and closing of the discharge passage means, result in filling of the gate float to cause closing of the gate.

5. Improved apparatus as claimed in claim 4, wherein means are provided between said float lever and said floats for varying the vertical relationships of the two floats with respect to their lever arms so as to enable the control conditions to be varied.

6. Improved apparatus as claimed in claim 5, wherein the second float operated by the level of the water in the discharge stream in the canal is of greater buoyancy than the first float so that it will over-ride the force exerted by the first float.

References Cited by the Examiner
UNITED STATES PATENTS 2,207,479   7/1940   Danel _____ 61—25

FOREIGN PATENTS 17,411   10/1900   Great Britain.
747,149   3/1956   Great Britain.

EARL J. WITMER, *Primary Examiner.*